3,278,540
PROCESS FOR PREPARING PIPERIDINE

John Anthony Corran, Widnes, England, assignor to Imperial Chemical Industries Limited, London, England, a corporation of Great Britain
No Drawing. Filed Feb. 18, 1963, Ser. No. 259,409
Claims priority, application Great Britain, May 16, 1962, 18,882/62
6 Claims. (Cl. 260—290)

This invention relates to a catalytic process for the manufacture of organic bases, and more particularly for the manufacture of piperidine.

It is known to make organic bases, particularly pyridine, by passing mixtures of tetrahydrofurfuryl alcohol and ammonia over heated catalysts for example alumina. The use of a cobalt oxide/molybdenum oxide/alumina catalyst for this purpose is disclosed in U.S. Patent No. 2,963,484. In copending U.S. application Serial No. 259,413, filed concurrently herewith on February 18, 1963, there is described the use of a zinc oxide/molybdenum oxide/alumina catalyst for use in this process, and this catalyst may be used in particular at temperatures between 450° and 600° C., and preferably between 500° and 525° C.

The formation of pyridine from tetrahydrofurfuryl alcohol by vapor-phase catalytic routes is accompanied by formation of appreciable proportions of carbonaceous deposits (i.e. coke) on the catalyst, with consequent waste of raw materials and deactivation of the catalyst.

It has now been found that when the zinc oxide/molybdenum oxide/alumina catalyst or the cobalt oxide/molybdenum oxide/ alumina catalyst is employed at lower temperatures than those used for pyridine formation, piperidine can be obtained as product.

Thus according to this invention there is provided a process for the manufacture of piperidine which comprises passing a mixture of tetrahydrofurfuryl alcohol and ammonia in the vapor phase at an elevated temperature below 450° C. over a catalyst containing molybdenum oxide and alumina in combination with zinc oxide or cobalt oxide.

The catalyst may be in a finely divided form or may be pelleted before use, and may be made for example by mixing aqueous solutions of ammonium molybdate and a zinc or cobalt salt in the presence of alumina and then evaporating the mixture to dryness and igniting it. It is preferred to use a zinc or cobalt salt, for example the nitrate, which is converted to the oxide on ignition in air or oxygen. The proportion of zinc, cobalt and molybdenum oxides together is preferably from 1% to 20% of the catalyst by weight, the remainder being alumina; smaller proportions tend to give a catalyst of low activity and higher proportions may lead to brittleness in pelleted forms of the catalyst.

The proportions of ammonia and tetrahydrofurfuryl alcohol which may be used can be varied considerably. In general, the proportions should be between 1 and 10 molecular proportions of ammonia for each molecular proportion of tetrahydrofurfuryl alcohol, as larger proportions do not tend to produce any additional increase in the yield of piperidine but may require expensive recovery, and smaller proportions tend to decrease the efficiency of conversion of tetrahydrofurfuryl alcohol to piperidine. In particular it is preferred to use the ammonia and tetrahydrofurfuryl alcohol in a molar ratio of about 5:1 (i.e. about 8.5 parts of ammonia to 10 parts of tetrahydrofurfuryl alcohol by weight). The rate of flow through the catalyst can be varied widely; in particular liquid hourly space velocities of 0.01 to 5 may be used. In general, high rates of throughput result in less of the tetrahydrofurfuryl alcohol being converted to carbonaceous matter on the catalyst and lower conversions of tetrahydrofurfuryl alcohol to piperidine while at lower space velocities the yields of piperidine are higher but the proportion of material (e.g. carbon) deposited on the catalyst is greater.

It is preferred to add hydrogen to the mixture of tetrahydrofurfuryl alcohol and ammonia, as this improves the yield of piperidine. The proportion of hydrogen is preferably between 1 and 10 moles for each mole of tetrahydrofurfuryl alcohol. Larger proportions may be used if desired, but tend to introduce problems of condensation and recirculation with the large volumes of gas then employed.

The reaction temperature is preferably in the range 300° C. to 400° C., as the efficiency of conversion of tetrahydrofurfuryl alcohol to either pyridine or piperidine is very low at temperatures below 300° C. and pyridine becomes the main product at temperatures above 400° C.

Piperidine may be recovered from the vapors emerging from the catalyst by conventional methods, for example by condensation, fractional distillation, treatment with caustic soda, or combinations of such techniques. The piperidine may be found to be admixed with a proportion of pyridine. Such mixtures may be separated in conventional manner, used without separation, or converted into derivatives as may be required. The piperidine may be converted into pyridine by dehydrogenation, and in the case of a product containing both pyridine and piperidine the mixture may be so treated, thus avoiding the need for a separation step. Likewise, the pyridine may be reduced to piperidine if desired. Dehydrogenation of piperidine to pyridine can be effected very conveniently by passing the piperidine vapor, preferably mixed with at least 7 molecular proportions of hydrogen, over a platinum or palladium catalyst (optionally supported on silica gel) at elevated temperature and especially between 200° and 500° C. Any unchanged tetrahydrofurfuryl alcohol recovered may be re-used.

It is usually most convenient to operate the process by vaporising tetrahydrofurfuryl alcohol at the desired rate, mixing the vapor with the desired proportion of ammonia, heating the mixture and passing it through a bed of catalyst particles or granules in a reaction vessel which is maintained at the requisite reaction temperature by external heating. An inert carrier gas such as nitrogen or steam may also be mixed with the vapor stream to be passed over the catalyst, and this improves the efficiency of the process, particularly when the inert gas is steam.

The reaction proceeds satisfactorily at substantially atmospheric pressure and there is no noticeable advantage in using greater or lower pressures, though these may be used if desired.

When the catalyst activity diminishes to an uneconomic level by accumulation of organic matter, the catalyst may be regenerated by burning out the organic matter by heating in a stream of air or oxygen at elevated temperature, particularly between 400° and 550° C. The temperature used for this regeneration preferably should not exceed about 600° C., and steam or nitrogen may be mixed with the air to minimize variations in temperature.

The process of the present invention can be carried out using a static catalyst, or using a fluidized bed technique in which the catalyst particles are circulated while suspended in the reactant vapors. This fluidized bed technique has the advantage of easier temperature control, more nearly uniform catalyst temperature, longer periods of operation between successive regeneration steps, improved yields of product, and an increase in the ratio of production time to regeneration time in operation. The overall advantages of using the fluidized catalyst are especially useful, and this method of operation is preferred.

The invention is illustrated but not limited by the following examples in which the parts and percentages are by weight.

*Example 1*

197 parts of ammonium molybdate are dissolved in a hot mixture of 70 parts of aqueous ammonia solution (specific gravity 0.880) and 200 parts of water. This solution is mixed with 1008 parts of alumina which has previously been calcined at 450° C. for 5 hours. An aqueous solution of 118.5 parts of zinc nitrate hexahydrate in 222 parts of water is then added and the whole is thoroughly mixed, dried at 105° C., and calcined for 4 hours at 450° C. The calcined solid is crushed and graded to a particle size of between 76 and 152 microns. Analysis of this catalyst shows it to contain 9.0±0.1% molybdenum and 2.2±0.1% zinc. Before use for pyridine production, the catalyst is heated to 520° C. and purged for 2 hours in a stream of nitrogen, 30 minutes in a stream of hydrogen and finally 10 minutes in a stream of ammonia.

330 parts of the zinc molybdate catalyst made as described above is used in the form of a fluidized bed in a reactor tube of 1.2 inches (3 cm.) internal diameter provided with a central thermocouple pocket and heated in an electrical resistance furnace. The expanded depth of catalyst is about 22 inches (56 cm.). Mixtures of tetrahydrofurfuryl alcohol ("THFA"), ammonia and hydrogen as described below in Table 1, are passed through the reactor during the given reaction times while the main body of catalyst is kept at the given temperature values. The reaction products emerging from the catalyst bed are condensed, and the products found by gas-liquid chromatographic analysis are as indicated in Table 1 below.

TABLE 1

| Total Reactants Fed In— | | | Reaction Time, hrs. | Catalyst Temperature, ° C. | Percent THFA recovered | Percent Yield Pyridine | Percent Yield Piperidine |
| --- | --- | --- | --- | --- | --- | --- | --- |
| THFA, g. | NH₃, g. | H₂, g. | | | | | |
| 377 | 335 | 40 | 11 | 250 | 33 | 0.8 | 1.3 |
| 534 | 434 | 51 | 17 | 350 | 3.4 | 8.9 | 10 |
| 429 | 374 | 44 | 17 | 450 | 4.1 | 48 | 0.3 |

The reaction time given is the period during which the reactants are passed through the reactor.

*Example 2*

The procedure of Example 1 is repeated, except that a mixture of 508 parts of tetrahydrofurfuryl alcohol, 434 parts of ammonia and 714 parts of nitrogen is passed through the fluidized catalyst during a period of 17 hours while the catalyst bed is maintained at 350° C. The resulting reaction products are found to contain 30.5 parts of pyridine (equivalent to a 7.7% yield based on the tetrahydrofurfuryl alcohol fed in) and 42.8 parts of piperidine (equivalent to a 10% yield based on the tetrahydrofurfuryl alcohol fed in).

*Example 3*

The procedure of Example 1 is repeated except that there are used 330 parts of a catalyst comprising 10 parts of cobalt molybdate on 90 parts of gamma-alumina and having a particle size range of 100–200 B.S.S. mesh. The expanded depth of catalyst is again 22 inches. 528 parts of tetrahydrofurfuryl alcohol mixed with 434 parts of ammonia and 51 parts of hydrogen is passed through the catalyst during 17 hours while the catalyst bed is at 350° C. The reaction products are found to contain 35.8 parts of pyridine (equivalent to a 8.8% yield based on the tetrahydrofurfuryl alcohol fed in) and 27.7 parts of piperidine (equivalent to a 6.3% yield on tetrahydrofurfuryl alcohol fed in).

What is claimed is:

1. A process for the preparation of piperidine which comprises passing a mixture of hydrogen, tetrahydrofurfuryl alcohol and ammonia in the vapor phase over a catalyst at a temperature ranging from 300° C. to 450° C. utilizing a catalyst consisting essentially of molybdenum oxide, alumina and zinc oxide, and proportions such that said ammonia and tetrahydrofurfuryl alcohol are used in a molar ratio between 1:1 and 10:1, said hydrogen is present in an amount between 1 and 10 moles for each mole of tetrahydrofurfuryl alcohol, and the molybdenum and zinc oxides together constitute from 1% to 20% weight of the catalyst.

2. Process as claimed in claim 1 wherein the temperature used is between 300° C. and 400° C.

3. Process as claimed in claim 1 wherein an inert carrier gas is mixed with the vapor stream to be passed over the catalyst.

4. Process as claimed in claim 1 wherein the catalyst is used in the form of a fluidized bed.

5. Process as claimed in claim 1 wherein the piperidine product is dehydrogenated to pyridine.

6. The process of claim 1 wherein the ammonia and tetrahydrofurfuryl alcohol are used in a molar ratio between about 1:1 and about 5:1.

References Cited by the Examiner

UNITED STATES PATENTS

| 2,543,424 | 2/1951 | Spillane et al. | 260—290 |
| 2,963,484 | 12/1960 | Denton | 260—290 |
| 3,163,652 | 12/1964 | Manley et al. | 260—293.2 |

FOREIGN PATENTS

| 695,472 | 8/1940 | Germany. |

NICHOLAS S. RIZZO, *Examiner.*

ROBERT L. PRICE, ALAN L. ROTMAN,
*Assistant Examiners.*